United States Patent [19]

Ohta et al.

[11] Patent Number: 4,797,052
[45] Date of Patent: Jan. 10, 1989

[54] PALLET EXCHANGE APPARATUS

[75] Inventors: Takeshi Ohta, Nishio; Yoji Kamiya; Kunimichi Nakashima, both of Anjoh; Mitsuyoshi Taniguchi, Kariya, all of Japan

[73] Assignee: Toyoda Koki Kabushiki Kaisha, Kariya, Japan

[21] Appl. No.: 885,451

[22] Filed: Jul. 14, 1986

[30] Foreign Application Priority Data

Jul. 15, 1985 [JP]  Japan ................... 60-155789
Aug. 6, 1985 [JP]  Japan ................... 60-172959

[51] Int. Cl.<sup>4</sup> ................................ B65G 47/90
[52] U.S. Cl. ........................ 414/744.3; 29/33 P; 198/346.1; 414/223; 414/225
[58] Field of Search ........... 414/222, 223, 225, 226, 414/744 R; 104/33, 99; 198/346.1, 465.1; 29/33 P, 563

[56] References Cited

U.S. PATENT DOCUMENTS

| | | | |
|---|---|---|---|
| 3,466,739 | 9/1969 | Harman | 29/568 |
| 3,825,245 | 7/1974 | Osburn et al. | 198/346.1 X |
| 4,185,376 | 1/1980 | Johnstone | 29/568 |
| 4,457,659 | 7/1984 | Watanabe | 414/223 |
| 4,480,738 | 11/1984 | Mattson | 198/339 |
| 4,498,571 | 2/1985 | Nomura et al. | 29/33 P |
| 4,637,108 | 1/1987 | Murata et al. | |

FOREIGN PATENT DOCUMENTS

| | | |
|---|---|---|
| 56-134160 | 10/1981 | Japan . |
| 57-81044 | 5/1982 | Japan . |
| 59-11310 | 1/1984 | Japan . |
| 61-39336 | 3/1986 | Japan . |

OTHER PUBLICATIONS

Article entitled "Fast Ways to Change Work, 1", American Machinist, Mar. 15, 1965, p. 109.

Primary Examiner—Kenneth J. Dorner
Assistant Examiner—Peter R. Brown
Attorney, Agent, or Firm—Oblon, Fisher, Spivak, McClelland & Maier

[57] ABSTRACT

A pallet exchange apparatus for a machine which includes a base, a pallet exchange arm rotatably mounted on the base, a turntable rotatably mounted on the base, an engaging mechanism provided on the turntable and a pallet guide mounted on the turntable. The pallet guide is shifted between a first position where a pallet supported thereon engages with an engaging portion of the pallet exchange arm and disengages from the engaging mechanism and a second position where the pallet engages with the engaging mechanism and disengages from the engaging portion of the exchange arm. The pallet exchange arm is rotated so as to exchange the pallets engaged with the engaging portion thereof between the turntable and a table of the machine.

4 Claims, 5 Drawing Sheets

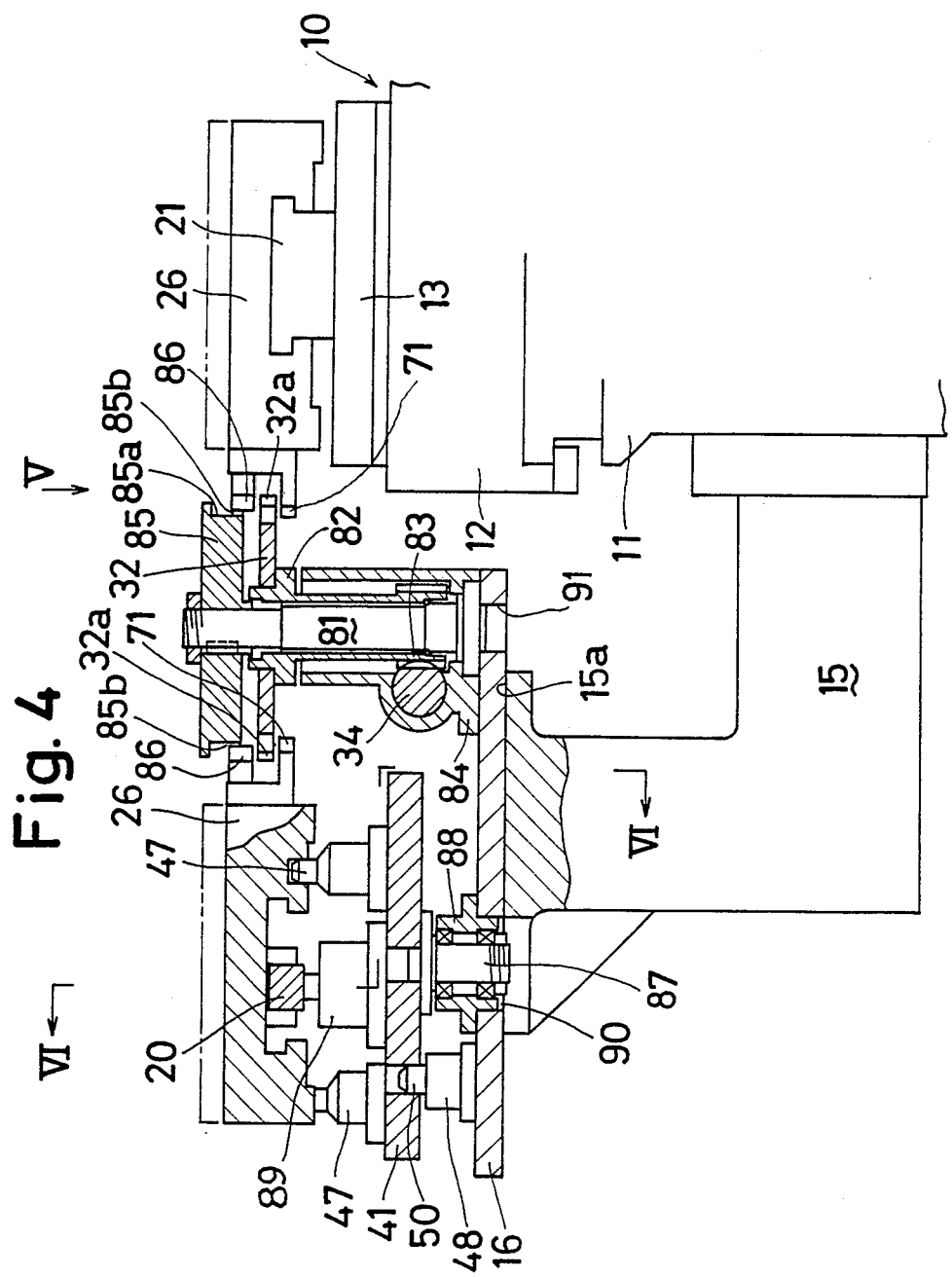

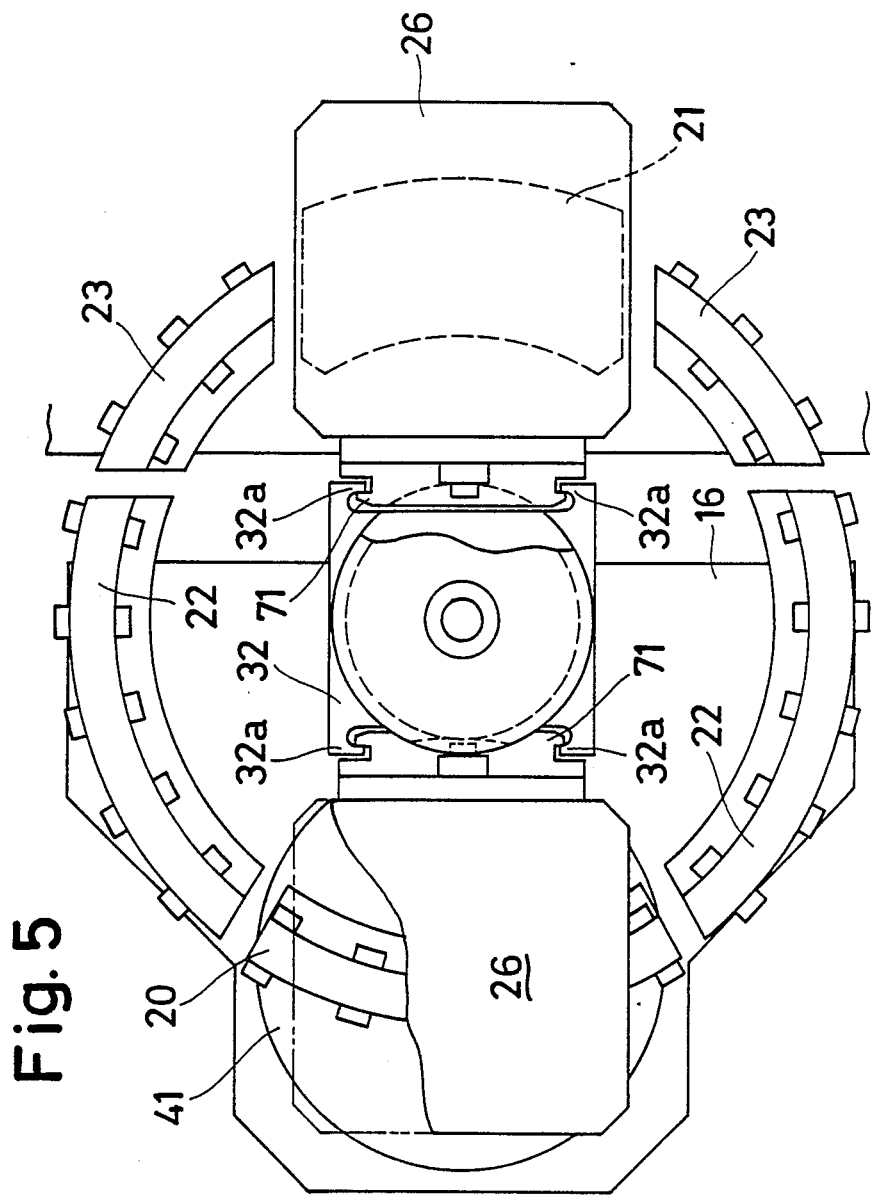

PALLET EXCHANGE APPARATUS

BACKGROUND OF THE INVENTION

1. Field of the Invention

The present invention relates to a pallet exchange apparatus for exchanging pallets between a table of a machine and turntable at a loading and unloading station.

2. Discussion of the Background

Pallet exchange apparatuses are known having a turntable at a loading and unloading station which is indexable to predetermined rotational positions to make it easy for an operator to load and unload a workpiece from a pallet mounted on the turntable, and an exchange mechanism for exchanging pallets between the turntable and a table of a machine tool.

In such pallet exchange apparatus, it is necessary to engage the pallet with the turntable and to disengage the same from the exchange mechanism during loading and unloading operation by the operator. In addition, it is necessary to engage the pallet with the exchange mechanism and to disengage the same from the turntable during the exchanging operation by the exchange mechanism.

Conventionally, such a pallet exchange apparatus is provided with pins which are slidably mounted on the turntable and which are moved by an actuator to engage with and be disengaged from the pallet, and a plurality of latches are pivotally mounted on the exchange mechanism and are rotated by an activator so as to engage with and be disengaged from the pallet.

Moreover, such conventional pallet exchange apparatus is operatively associated with a machine tool in such a manner as to place the pallet exchange apparatus in a desired approximate position relative to the machine tool followed by adjusting precisely the position of the exchange mechanism relative to the table of the machine tool, and finally, adjusting exactly the position of the turntable relative to the exchange mechanism.

As a result, such conventional pallet exchange apparatus becomes comparatively complex and large in structure as well as expensive. In addition, skill and time to adjust positions of the exchange mechanism and the turntable are required.

SUMMARY OF THE INVENTION

It is therefore an object of the present invention to provide an improved pallet exchange apparatus which avoids the drawbacks of known pallet exchange apparatuses.

Another object of the present invention is to provide a pallet exchange apparatus which is of relatively simple construction and is less expensive.

A further object of the present invention is to provide a pallet exchange apparatus wherein adjustment of positions of the exchange mechanism and the turntable is easier to accomplish and requires less time than conventional apparatuses.

Briefly, according to the present invention, these and other objects are achieved by providing a pallet exchange apparatus for a machine which includes a base, a pallet exchange arm rotatably mounted on the base, a turntable rotatably mounted on the base, engaging means provided on the turntable, a pallet guide mounted on the turntable, shifting means for shifting the pallet guide between a first position wherein a pallet supported thereon engages with an engaging portion of the pallet exchange arm and disengages from the engaging means and a second position where the pallet engages with the engaging means and disengages from the engaging portion of the exchange arm, and rotating means for rotating the pallet exchange arm so as to exchange the pallets between the turntable and a table of the machine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a partially sectional side elevation view of a second embodiment of pallet exchange apparatus according to the present invention;

FIG. 5 is a plan view taken in the direction of arrow V of FIG. 4; and

DESCRIPTION OF THE PREFERRED EMBODIMENTS

Figure 1:
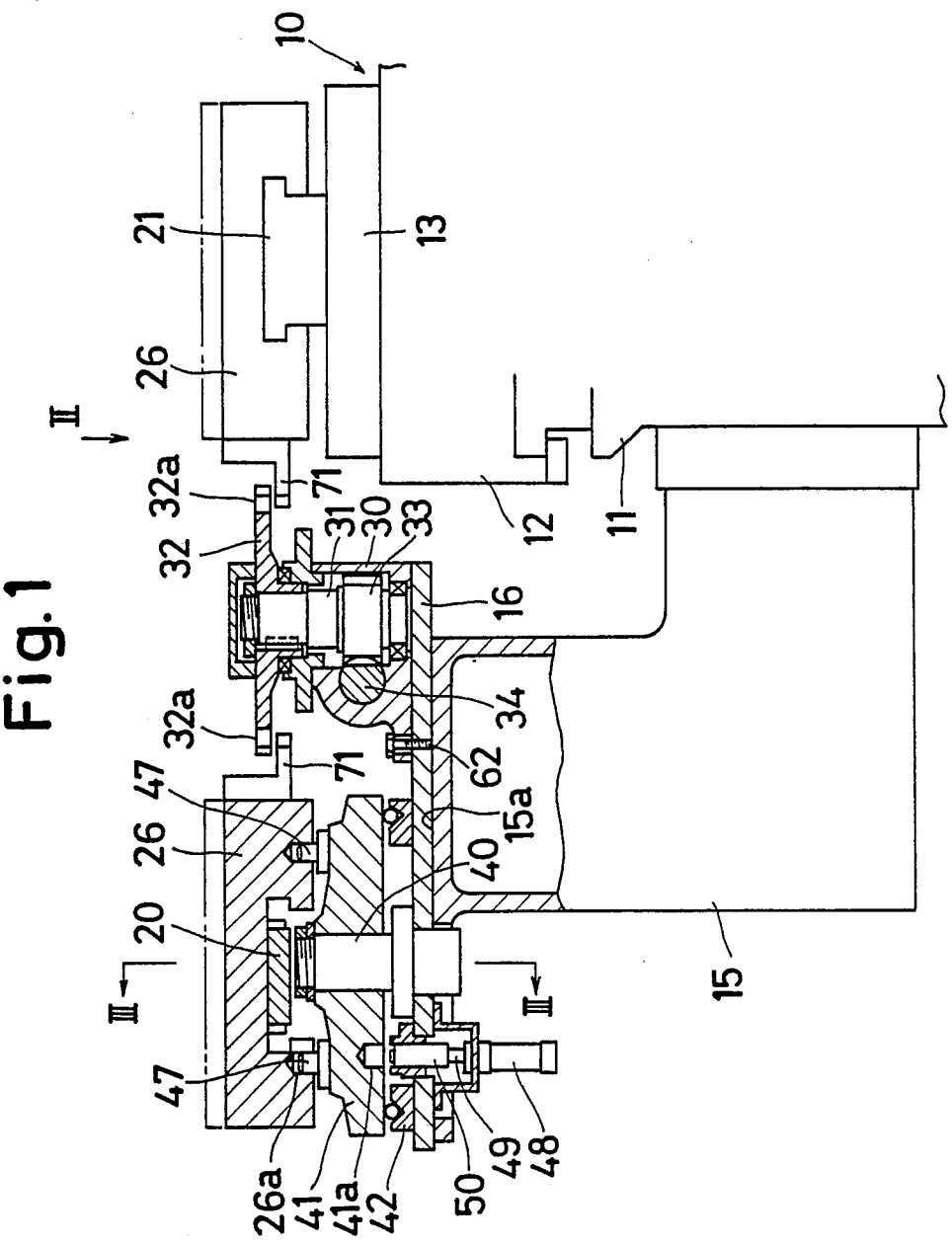
FIG. 1 is a partially sectional side elevation view of a pallet exchange apparatus according to the present invention.
Figure 2:
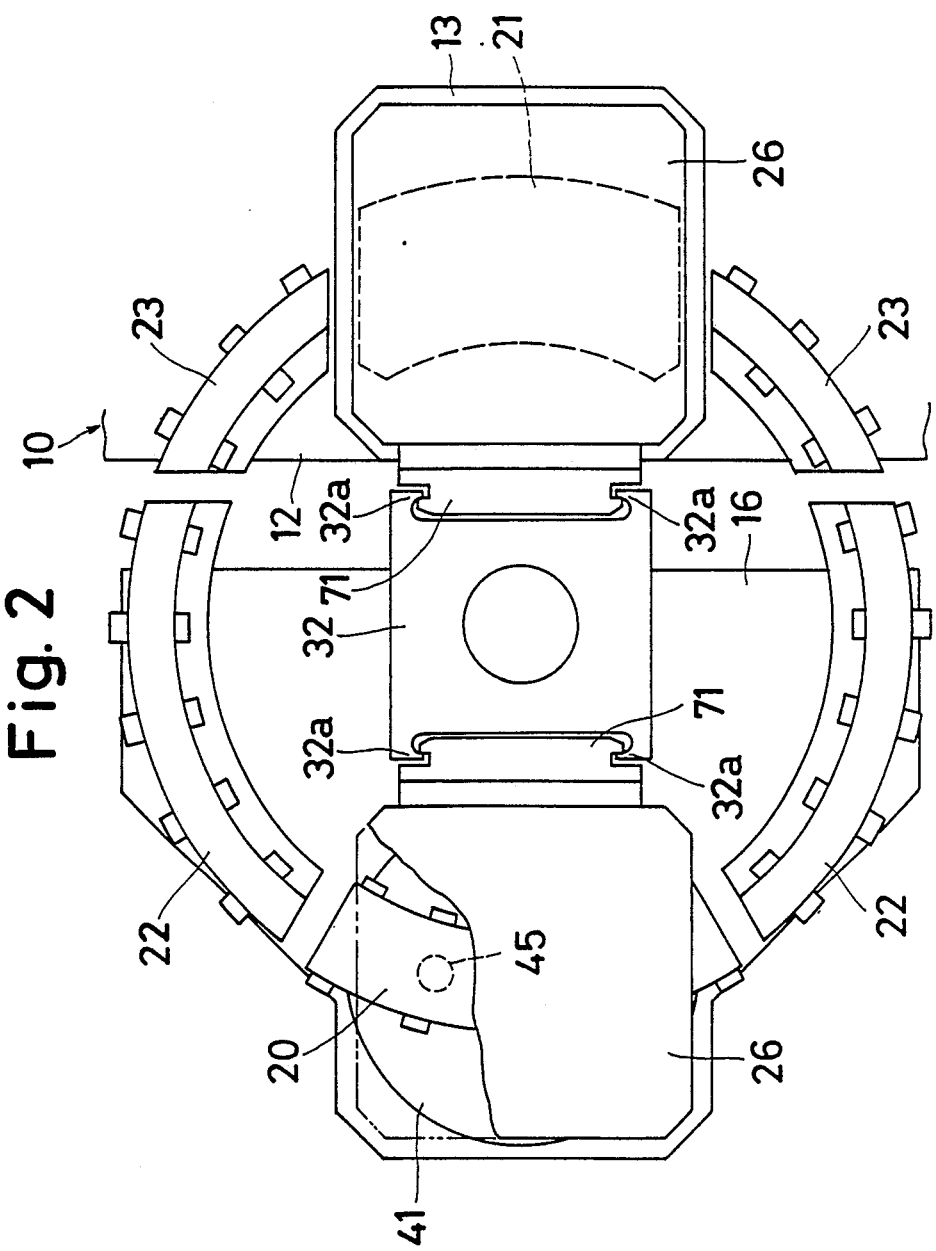
FIG. 2 is a plan view of the pallet exchange apparatus taken in the direction of arrow II of FIG. 1.

Referring now to the drawings and to FIGS. 1 and 2 in particular, there is shown a slidetable 12 which is horizontally slidably mounted on a bed 11 of a conventional machine tool 10. A worktable 13 is mounted for rotational indexing on slidetable 12. An arcuate clamp rail 21 is mounted on worktable 13 and is vertically movable so that a pallet 26 adapted to be slidably engaged with and supported by clamp rail 21 is positioned and clamped on worktable 13 upon descent of clamp rail 21 and is unclamped upon ascent of clamp rail 21. Further, on slidetable 12 are arranged a pair of arcuate guide rails 23, 23 located on both sides of clamp rail 21 at a height which corresponds to a raised position of clamp rail 21. At the time of exchanging pallets, slidetable 12 is positioned at a predetermined exchange position, and worktable 13 is rotationally indexed to an exchange position wherein clamp rail 21 aligns with guide rails 23, 23.

Figure 3:
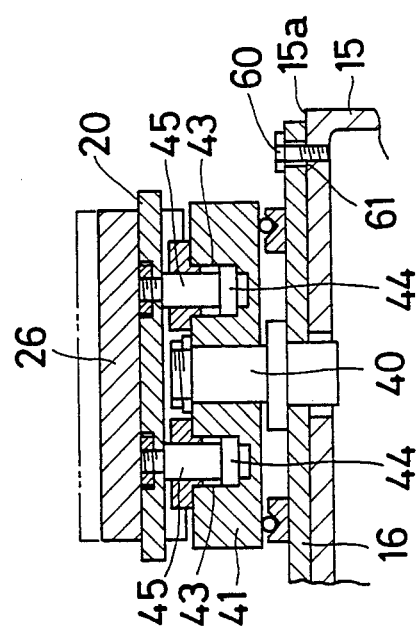
FIG. 3 is a sectional view taken along line III—III of FIG. 1.

A support frame 15 which has a horizontal mounting surface 15a is attached to bed 11. On horizontal mounting surface 15a is mounted a base 16 which is adjustably movable thereon in accordance with a clearance formed between bolts 60 screwed into mount surface 15a and holes 61 formed in base 16 as shown in FIG. 3. Base 16 is fixed to mount surface 15a with bolts 60 after positional adjustment as will be described hereinbelow.

An upright drive shaft 31 is rotatably journalled in a housing 30 which, in turn, is attached to base 16 with bolts 62. A pallet exchange arm 32 is fixed at a center portion thereof to an upper portion of drive shaft 31, and is provided with two pairs of engaging jaws 32a, 32a located at opposite ends thereof. A pinion 33 is formed on a lower portion of shaft 31 and is meshed with a rack 34 which is moved to and fro by a cylinder device (not shown) so as to rotate pallet exchange arm 32 through a 180° angle.

A rigid shaft 40 is uprightly fixed to base 16 at a loading and unloading station by locating pallet exchange arm 32 between shaft 40 and slidetable 12 positioned at the exchange position. A turntable 41 is rotatably fitted at a center portion thereof with rigid shaft 40, and is supported via bearing 42 which is arranged on base 16 in concentric relation with shaft 40. As shown in FIG. 3, a pair of vertical cylinders 43, 43 which slidably accommodate pistons 44, 44 are positioned on turntable 41 on opposite sides of rigid shaft 40. A guide rail 20 is attached to the top end portions of piston rods 45, 45 which project from pistons 44, 44 above turntable 41, so that guide rail 20 is moved up and down thereby. A pair of arcuate guide rails 22, 22 are arranged on base 16 on opposite sides of guide rail 20 at a height which corresponds to a raised position of guide rail 20. At the time of exchanging pallets, turntable 41 is rotationally positioned at an exchange position where guide rail 20 aligns with guide rails 22, 22. Accordingly, when worktable 13 and turntable 41 are rotationally positioned at the exchange positions, and clamp rail 21 and guide rail 20 are raised at the same height as guide rails 22, 22, 23, 23, guide rails 20, 22, 22, 23, 23 and clamp rails 21 constitute a circular track concentric with drive shaft 31. Guide rails 20, 22, 22, 23, 23 are provided with rotatable rollers on opposite sides thereof in a row so as to guide pallets 26, 26 along the circular track.

A pair of engaging pins 47, 47 are uprightly attached to turntable 41 so that engaging holes 26a, 26a of pallet 26 engage therewith when pallet 26 is lowered onto turntable 41 in accordance with the descent of guide rail 20.

Pallets 26, 26 have engaging blocks 71, 71 which extend outwardly of a turning radius of the pallets engage with respective pairs of engaging jaws 32a, 32a which do not extend into such turning radius at opposite ends of pallet excha respective pallets 26, 26 are raised in accordance with ascent of clamp rail 21 and guide rail 20.

A positioning pin 50 is slidably mounted on base 16 and is connected to a piston rod 49 of a cylinder 48 secured to base 16. Positioning pin 50 is moved up and down by cylinder 48 so as to be engaged with one of four positioning holes 41a formed on an under surface of turntable 41 at intervals of 90° angle; so as to rotationally position turntable 41.

Installation of the pallet exchange apparatus according to present invention will be described hereinafter. First, housing 30 is adjusted regarding its position relative to turntable 41 such that engaging jaws 32a, 32a of pallet exchange arm 32 engage with engaging block 71 of pallet 26 raised by guide rail 20, and then housing 30 is fixed to base 16 via bolts 62. Thereafter, base 16 is mounted on horizontal mount surface 15a and is adjusted regarding its position relative to worktable 13 positioned at the exchange position, such that engaging jaws 32, 32a engage with engaging block 71 of pallet 26 raised by clamp rail 21, and then base 16 is firmly fixed to mount surface 15a via bolts 60. As should be apparent from the above description, in equipping a machine with the present pallet exchange apparatus wherein it is merely required to adjust the position of base 16 on mounting surface 15a relative to worktable 13 while the adjustment of the position of exchange arm 32 relative to turntable 26 has already been completed beforehand, less skill and time are required in positional adjustment of its components.

Operation of the pallet exchange apparatus as constructed above will now be described. Upon completion of machining the workpiece carried on pallet 26 clamped on worktable 13 and slide table 12 is positioned at the exchange position and worktable 13 is rotationally indexed to the exchange position. The clamp rail 21 is moved upwardly so that the pallet 26 is unclamped from worktable 13 and is raised so as to cause engaging Block 71 of pallet 26 to engage with jaws 32a, 32a of exchange arm 32. Concurrently, at the loading and unloading station, guide rail 20 is caused to ascend by pistons 44, 44 so as to raise pallet 26 so that engaging holes 26a, 26a of pallet 26 disengage from engaging pins 47, 47 and engaging block 71 engages with jaws 32a, 32a. At this time, clamp rail 21 and guide rail 20 are aligned with guide rails 22, 22, 23, 23 at the same height in accordance with the ascent thereof so as to constitute the circular track concentric with the rotational center of pallet exchange arm 32.

Thereafter, pallet exchange arm 32 is rotated through 180° angle by the cylinder device so as to exchange pallet 26 on clamp rail 21 carrying the machined workpiece with pallet 26 on guide rail 20 carrying an unmachined workpiece. Then, clamp rail 21 is moved downwardly whereby pallet 26 is positioned and clamped on worktable 13, and engaging block 71 disengages from jaws 32a, 32a of exchange arm 32. Thereafter, slidetable 12 is moved to a programmed position for machining the workpiece on pallet 26.

As the same time, guide rail 20 is moved downwardly by piston 44, 44 so that engaging block 71 disengages from opposite jaws 32a, 32a of exchange arm 32 and engaging holes 26a, 26a of pallet 26 engage with engaging pins 47, 47 to position pallet 26 on turntable 41. Then the machined workpiece is unloaded from pallet 26 and the unmachined workpiece is loaded on pallet 26. In order to position turntable 41 at an appropriate rotational position for easy loading and unloading of the workpiece from pallet 26, positioning pin 50 is withdrawn from positioning hole 41a by cylinder 48, then turntable 41 is rotated to the appropriate rotational position, and positioning pin 50 is move upwardly by cylinder 48 so as to engage with selected positioning hole 41a. Upon completion of loading the unmachined workpiece on pallet 26, turntable 41 is rotationally positioned at the exchange position. Pin 50 may be moved up and down by a foot-operated pedal or hand-operated lever which is connected to pin 50 by means of link mechanism instead of utilizing cylinder 48.

Figure 6:
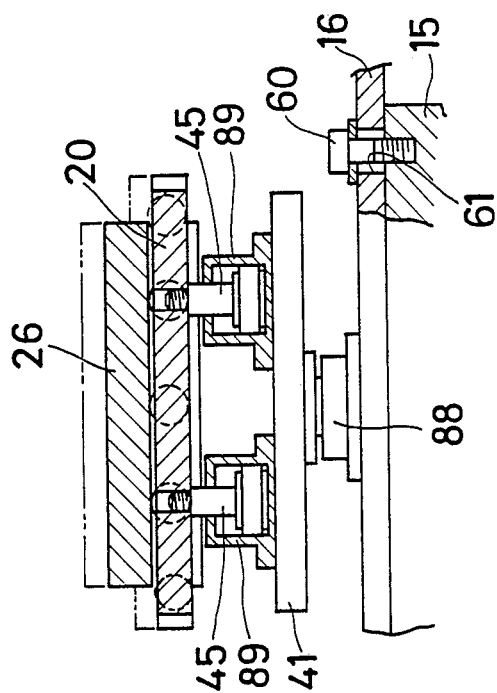
FIG. 6 is a sectional view taken along line VI—VI of FIG. 4.

The second embodiment of the present invention is shown in FIGS. 4 through 6, wherein the same reference numerals denote corresponding components to those in the first embodiment described hereinabove. An upright stationary shaft 81 is secured to base 16 and a tubular member 82 is rotatably journalled on stationary shaft 81. A pallet exchange arm 32 is fixed at a center portion thereof to an upper end of tubular member 82, and is provided with two pairs of engaging jaws 32a, 32a located at opposite ends thereof. A pinion 83 is formed on a lower portion of tubular member 82 and is meshed with a rack 34. Rack 34 is slidably mounted on a casing 84 fixed to base 16, and is moved to and fro by a cylinder device (not shown) so as to rotate pallet exchange arm 32 through a 180° angle.

A circular guide plate 85 which is provided with an annular guide groove 85a at its periphery is secured to a top of stationary shaft 81 above pallet exchange arm 32. A pair of openings 85b, 85b are formed on a lower rim of groove 85a at opposite positions corresponding to worktable 13 and turntable 41 so that when pallets 26, 26 are raised by clamp rail 21 and guide rail 20, respective guide rollers 86, 86 attached to pallets 26, 26 can be placed into annular guide groove 85a.

At the loading and unloading station, turntable 41 is secured to a rotatable shaft 87 which is journalled on a case 88 fixed to base 16. As shown in FIG. 6, a guide rail 20 is attached to the ends of piston rods 45, 45 of cylinder devices 89, 89 which are secured to turntable 41.

Stationary shaft 81 and case 88 are fitted with bores 90, 91 so as to be positioned in such a positional relation that engaging block 71 may engage with engaging jaws 32a, 32a of pallet exchange arm 32 when pallet 26 is raised by guide rail 20. Therefore, in the second embodiment, positional adjustment of pallet exchange arm 32 relative to turntable 41 is not necessary. Positional adjustment of base 16 on horizontal mount surface 15a is required to be accomplished in the same manner as in the first embodiment.

In operation, when the pallets are raised by clamp rail 21 and guide rail 20, engaging blocks 71, 71 engage with jaws 32a, 32a of pallet exchange arm 32 and guide rollers 86, 86 are located in annular guide groove 85a through openings 85b, 85b. Thereafter, pallet exchange arm 32 is rotated through a 180° angle by the cylinder device so as to exchange pallets 26, 26 between worktable 13 and turntable 41. While pallets 26, 26 are transferred along the circular track constituted by clamp rail 21 and guide rals 20, 22, 22, 23, 23, guide rollers 86, 86 attached to pallets 26, 26 run in annular guide groove 85a so as to prevent pallets 26, 26 from being inclined on the track.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A pallet exchange apparatus for exchanging pallets between a table of a machine and a turntable at a loading and unloading station, comprising:

a base, said turntable being rotatably mounted on said base;

pallet engaging means mounted on said turntable;

a movable arcuate pallet guide mounted on said turntable;

engaging blocks mounted on a side surface of said pallets and extending outwardly of a turning radius of said pallets at said loading and unloading station;

a pallet exchange arm rotatably mounted on said base and having engaging portions formed at respective ends thereof; wherein said pallet exchange arm does not extend into said turning radius of said pallets at said loading and unloadng station;

cylinder means mounted on said turntable for shifting said movable arcuate pallet guide between a first position wherein said engaging blocks engage with said engaging portions of said pallet exchange arm and said pallet disengages from said engaging means and a second position wherein one of said pallets engages with said engaging means and said engaging blocks disengage from said engaging portion of said pallet exchange arm;

means for rotationally positioning said turntable at an exchange position;

a pair of fixed arcuate pallet guides secured to said base upon placement of said movable pallet guide therebetween, so as to constitute a circular track for guiding said pallets when said movable pallet guide is shifted to said first position and said turntable is positioned at said exchange position; and means for rotating said pallet exchange arm while said pallet guide is shifted to said first position and said turntable is positioned at said exchange position, so as to exchange said pallets between said turntable and said table of said machine.

2. A pallet exchange apparatus as set forth in claim 1, further comprising a support frame which is bodily attached to a bed of said machine and which has a mounting surface parallel with a plane within which said machine table lies; and means for adjustably fixing said base onto said mounting surface after positioning of said pallet exchange arm relative to said machine table.

3. A pallet exchange apparatus as set forth in claim 1, further comprising a shaft which is uprightly fixed to said base and on which said pallet exchange arm is rotatably journalled.

4. A pallet exchange apparatus as set forth in claim 1, wherein said cylinder means comprises a pair of cylinders each of which is mounted on said turntable on opposite sides of a rotational axis of said turntable.

* * * * *